United States Patent
Cockram et al.

(10) Patent No.: US 12,039,708 B2
(45) Date of Patent: Jul. 16, 2024

(54) DATA PROCESSING

(71) Applicant: Sony Interactive Entertainment Inc., Tokyo (JP)

(72) Inventors: Philip Cockram, London (GB); Anthony Dann, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/519,840

(22) Filed: Nov. 5, 2021

(65) Prior Publication Data

US 2022/0148140 A1    May 12, 2022

(30) Foreign Application Priority Data

Nov. 10, 2020  (GB) ...................... 2017690

(51) Int. Cl.
   *G06T 5/92*  (2024.01)
   *G06T 11/00*  (2006.01)
   *G06T 15/04*  (2011.01)
   *G06T 19/00*  (2011.01)

(52) U.S. Cl.
   CPC .............. *G06T 5/92* (2024.01); *G06T 11/001* (2013.01); *G06T 15/04* (2013.01); *G06T 19/006* (2013.01)

(58) Field of Classification Search
   CPC .................................................. G06T 5/009
   See application file for complete search history.

(56) References Cited

U.S. PATENT DOCUMENTS

| 2016/0156812 | A1* | 6/2016 | Arrighetti | G06T 19/20 345/590 |
|---|---|---|---|---|
| 2018/0130264 | A1 | 5/2018 | Ebacher | |
| 2020/0051483 | A1* | 2/2020 | Buckley | G09G 3/2044 |

FOREIGN PATENT DOCUMENTS

EP    3489801 A1    5/2019

OTHER PUBLICATIONS

Combined Search and Examination Report for corresponding GB Application No. 2017690.5, 6 pages, dated May 7, 2021.
Examination Report for corresponding GB Application No. GB2017690.5, 4 pages, dated Sep. 26, 2023.

* cited by examiner

*Primary Examiner* — Shivang I Patel
(74) *Attorney, Agent, or Firm* — Matthew B. Dernier, Esq.

(57) ABSTRACT

A computer-implemented method includes executing an initial version of computer game software, the executing step including rendering computer game video images for display; displaying the video images using a head mountable display (HMD); detecting user operation of one or more user controls to perform colour grading adjustments; applying the colour grading adjustments to the video images rendered by the rendering step; and generating colour grading data to be associated with a revised version of the computer game software; in which the executing step and the applying step are performed by different respective data processing apparatus.

10 Claims, 8 Drawing Sheets

DATA PROCESSING

BACKGROUND OF THE INVENTION

Field of the Invention

This disclosure relates to data processing.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the context of authoring video game programs or the like, a process known as "colour grading" may be used. Colour grading refers to varying (with the aim at least of improving) the visual appearance of video material output by the video game program for display. Colour grading is performed by a so-called colourist.

Where the video game involves displaying images on a head mountable display (HMD), a typical workflow for this process involves the colourist performing an iteration of colour grading on, for example, a host computer such as a personal computer (PC), building the game (in the sense of assembling all of the compiled components and resources together into working software), loading the game onto a target entertainment device or console, executing the video game on the target console, and the colourist checking whether the colour grading is acceptable. If not, a further iteration of this whole process is performed.

It is in this context that the present disclosure arises.

SUMMARY OF THE INVENTION

The present disclosure provides a computer-implemented method comprising:

executing an initial version of computer game software, the executing step including rendering computer game video images for display;

displaying the video images using a head mountable display (HMD);

detecting user operation of one or more user controls to perform colour grading adjustments;

applying the colour grading adjustments to the video images rendered by the rendering step; and generating colour grading data to be associated with a revised version of the computer game software; in which the executing step and the applying step are performed by different respective data processing apparatus.

The present disclosure also provides data processing apparatus comprising:

a processing system comprising a first processing apparatus and a second processing apparatus in communication with the first processing apparatus, the first processing apparatus being configured to execute an initial version of computer game software, the executing including rendering computer game video images for display; and a head mountable display (HMD) configured to display the video images;

the first processing apparatus being configured to detect user operation of one or more user controls to perform colour grading adjustments;

the processing system being configured to apply the colour grading adjustments to the video images rendered by the rendering step; and the second processing apparatus being configured to generate colour grading data to be associated with a revised version of the computer game software.

Various further aspects and features of the present disclosure are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Example Hardware and Software Overview

The techniques to be discussed here can make use of two or more separate processing arrangements.

Referring now to the drawings, wherein like reference numerals designate identical or corresponding parts throughout the several views, an entertainment device or console or computer games machine (such as that shown schematically in FIG. 1) executes a video game under development and performs further functionality to be discussed below. The use of an entertainment device is of course just one example. Instead, for example, portable communication devices such as mobile telephony devices, so-called smart phones, portable computers, desktop or less-portable computers, smart watches or other wearable devices, or any other generic data processing devices could be used. The execution of a computer game is also just one example. Instead, any computer software which provides for the generation of images or video material to be viewed by an end-user could be handled under the present techniques.

A separate PC (such as that shown schematically in FIG. 10) is used to control the colour grading process itself in the examples to be discussed below. However, the processes performed by the PC could in fact be performed by (for example) another entertainment device also of the type shown in FIG. 1 for example, though separate to the entertainment device by which the HMD content is generated for display. For the purposes of the description below, references to a "PC" are to be taken as referring to a separate data processing apparatus performing the functions attributed in the description to the PC.

With these considerations providing technical context, an example entertainment device will now be described with reference to FIG. 1. An example of a separate data processing apparatus, for example to be used for parameter, will be described with reference to FIG. 10.

Example Entertainment Device

Figure 1:
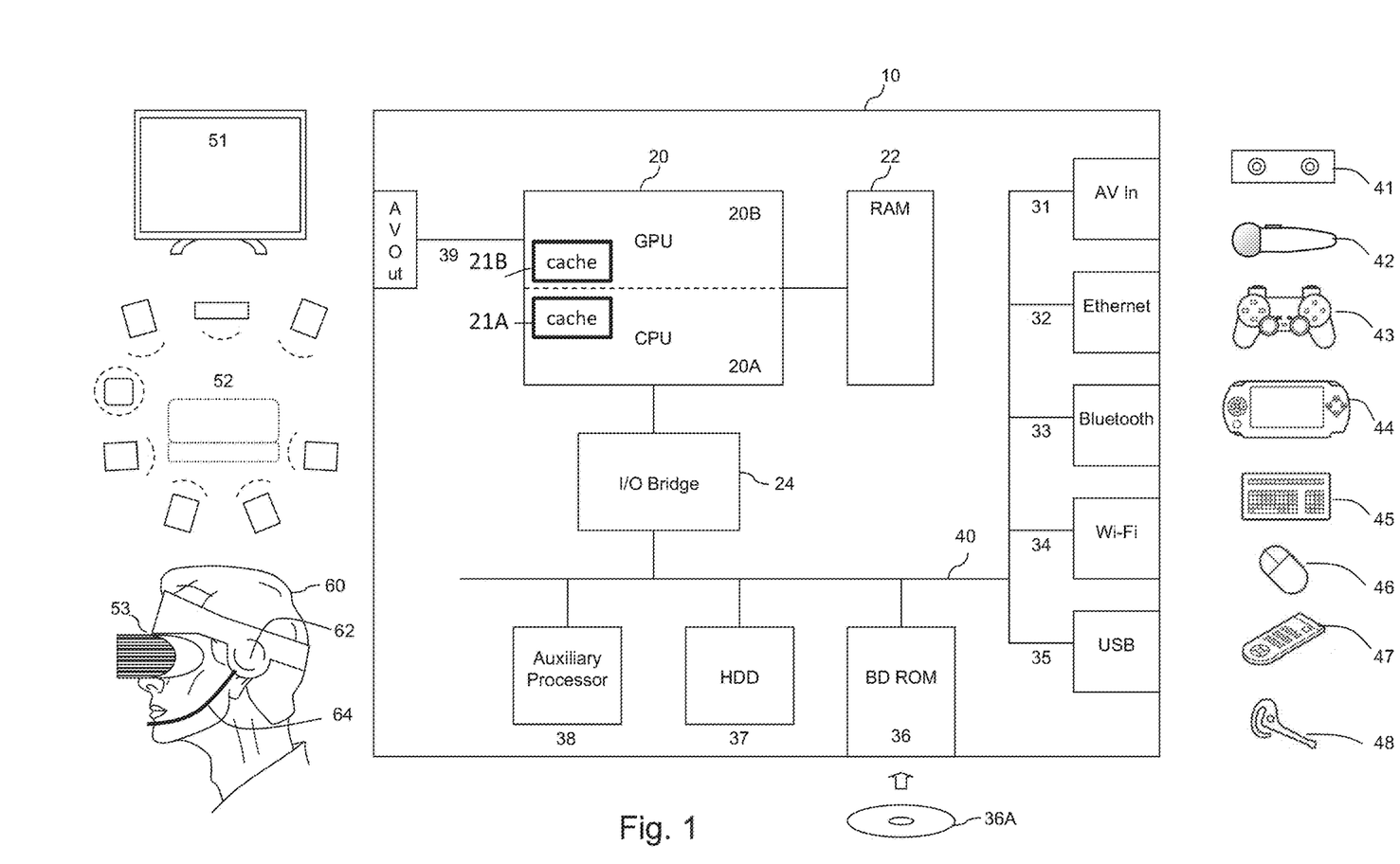
FIG. 1 schematically illustrates an example entertainment device.

Referring now to the drawings, FIG. 1 schematically illustrates the overall system architecture of an example entertainment device such as a games console. A system unit 10 is provided, with various peripheral devices connectable to the system unit.

The system unit 10 comprises a processing unit (PU) 20 that in turn comprises a central processing unit (CPU) 20A and a graphics processing unit (GPU) 20B. The PU 20 has access to a random access memory (RAM) unit 22. One or both of the CPU 20A and the GPU 20B may have access to a cache memory, which may be implemented as part of the respective device and/or as a portion of the RAM 22.

The PU 20 communicates with a bus 40, optionally via an I/O bridge 24, which may be a discrete component or part of the PU 20.

Connected to the bus 40 are data storage components such as a hard disk drive 37 (as an example of a non-transitory machine-readable storage medium) and a Blu-ray® drive 36 operable to access data on compatible optical discs 36A. In place of or in addition to the hard disk drive 37, a so-called solid state disk device (which is a solid state device which is formatted to mimic a hard drive's storage structure in operation) or a flash memory device may be used. Additionally the RAM unit 22 may communicate with the bus 40.

In operation, computer software to control the operation of the device 10 may be stored by the BD-ROM 36A/36 or the HDD 37 (both examples of non-volatile storage) and is executed by the PU 20 to implement the methods discussed here, possibly with a temporary copy of the computer software and/or working data being held by the RAM 22.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style video game controllers 42 such as the PlayStation® Move and conventional handheld video game controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 (HMD) worn by a user 60, for example communicating with the device by a wired or wireless connection and powered either by a battery power source associated with the HMD or by power provided using such a wired connection.

The HMD may have associated headphones 62 (for example, a pair of earpieces) to provide mono and/or stereo and/or binaural audio to the user 60 wearing the HMD. A microphone 64, such as a boom microphone as drawn, depending from the headphones 62 or a supporting strap or mount of the HMD, may be provided to detect speech or other audio contributions from the user 60.

Therefore, the arrangement of FIG. 1 provides at least three examples of arrangements for audio communication by the user 60, namely (i) the earphones 62 and microphone 64; (ii) the headset 48; and (iii) a headphone connection to the hand-held controller 43.

In more detail, regarding processing, the CPU 20A may comprise a multi-core processing arrangement, and the GPU 20B may similarly provide multiple cores, and may include dedicated hardware to provide so-called ray-tracing, a technique which will be discussed further below. The GPU cores may also be used for graphics, physics calculations, and/or general-purpose processing.

Optionally in conjunction with an auxiliary audio processor (not shown), the PU 20 generates audio for output via the AV output 39. The audio signal is typically in a stereo format or one of several surround sound formats. Again this is typically conveyed to the television 51 via an HDMI® standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, as mentioned above the video and optionally audio may be conveyed to a head mounted display 53 such as the Sony® PSVR display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device may operating under the control of an operating system which may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

Upon start-up, respective users are asked to select their respective accounts using their respective controllers, so that optionally in-game achievements can be subsequently accredited to the correct users. New users can set up a new account. Users with an account primarily associated with a different entertainment device can use that account in a guest mode on the current entertainment device.

Once at least a first user account has been selected, the OS may provide a welcome screen displaying information about new games or other media, and recently posted activities by friends associated with the first user account.

When selected via a menu option, an online store may provide access to game software and media for download to the entertainment device. A welcome screen may highlight featured content. When a game is purchased or selected for download, it can be downloaded for example via the Wi-Fi connection 34 and the appropriate software and resources stored on the hard disk drive 37 or equivalent device. It is then copied to memory for execution in the normal way.

A system settings screen available as part of the operation of the operating system can provide access to further menus enabling the user to configure aspects of the operating system. These include setting up an entertainment device network account, and network settings for wired or wireless communication with the Internet; the ability to select which notification types the user will receive elsewhere within the user interface; login preferences such as nominating a primary account to automatically log into on start-up, or the use of face recognition to select a user account where the video camera 41 is connected to the entertainment device; parental controls, for example to set a maximum playing time and/or an age rating for particular user accounts; save data management to determine where data such as saved games is stored, so that gameplay can be kept local to the device or stored either in cloud storage or on a USB to enable game progress to be transferred between entertainment devices; system storage management to enable the user to determine how their hard disk is being used by games and hence decide whether or not a game should be deleted; software update management to select whether or not updates should be automatic; audio and video settings to provide manual input regarding screen resolution or audio format where these cannot be automatically detected; connection settings for any companion applications run on other devices such as mobile phones; and connection settings for any portable entertainment device 44, for example to pair such a device with the entertainment device so that it can be treated as an input controller and an output display for so-called 'remote play' functionality.

The user interface of the operating system may also receive inputs from specific controls provided on peripherals, such as the hand-held controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

Example of Previously Proposed Colour Grading Process

A previously proposed colour grading process will be described with reference to FIGS. 2 and 3.

Colour grading is performed by the colourist at a PC 240 using a display screen of the PC 240, leading to the generation of a so-called lookup table (LUT) 230 providing a mapping of display colours. A trial version of the video game is built at the PC 240 and loaded, via a connection 220 such as a wired, wireless, network or Internet connection to a video game console system 200 comprising an entertainment device 10 having an associated controller 43 and an HMD 53 by which the colourist can execute the trial version of the video game, inspecting the colour properties of display images using the HMD 53.

Figure 3:
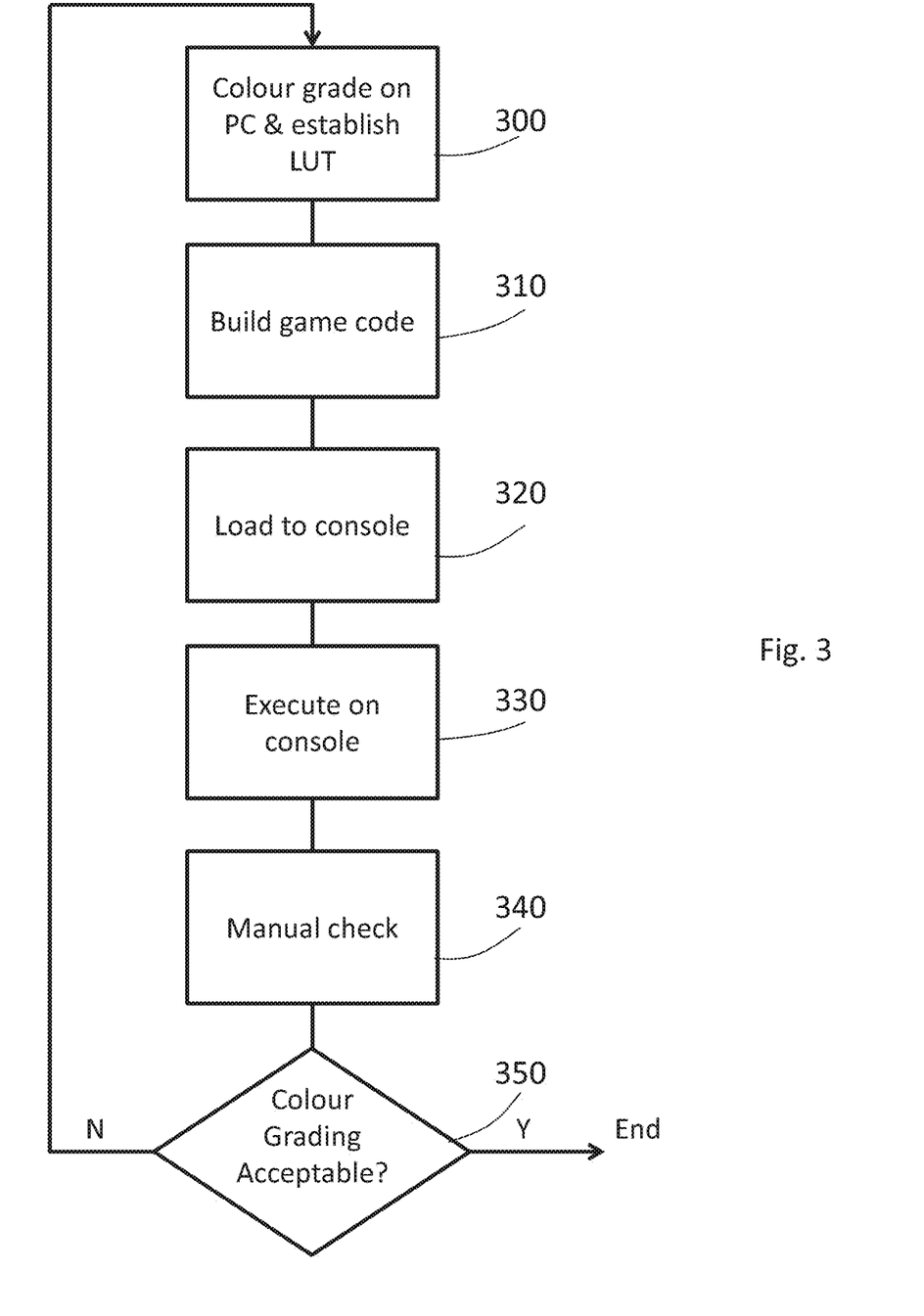
FIG. 3 is a schematic flowchart illustrating a previously proposed method.

This previously proposed process is summarised by the schematic flowchart of FIG. 3 in which, at a step 300, the colourist performs colour grading at the PC 240, establishing the LUT. Using that LUT, the game code is built at a step 310 and loaded to the console system 200 at a step 320. The colourist then executes the video game on the console system at a step 330 and manually (which is to say, visually) checks the colour properties of the display images during trial gameplay. If the colour grading is acceptable at a step 350 then the process ends; otherwise another full iteration from the step 300 is performed.

Colour grading may be performed in the context of a so-called high dynamic range (HDR) video display arrangement, but the present techniques are not limited to HDR colour grading.

Use of Colour Lookup Tables

Figure 4:
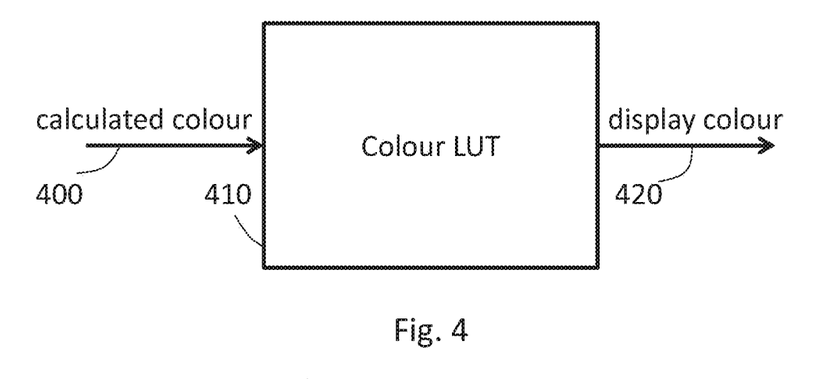
FIGS. 4 to 6 schematically illustrate colour look up tables.

In some examples, at least a part of the colour grading process can involve remapping colours for display. A schematic overview of this process is provided by FIG. 4, in which a raw or calculated colour 400 for a particular pixel or other display element is provided to a colour LUT 410 by which it is mapped to a display colour 420.

Figure 5:
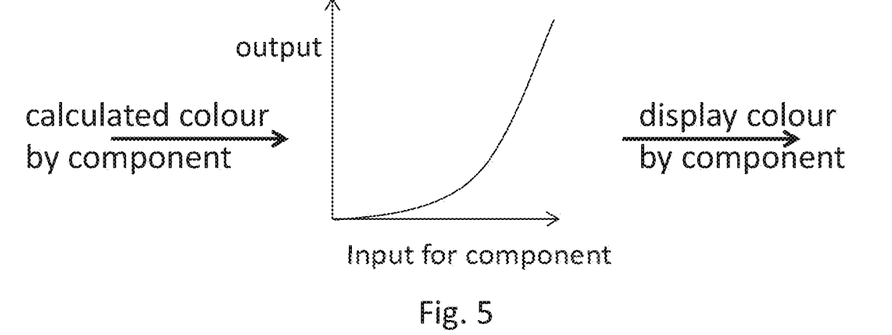

In the example of FIG. 5, each colour component (for example, red, green, or blue (RGB) components) is subject to a mapping appropriate to that colour component defined by a respective mapping table. Such an arrangement can provide many degrees of variation of the display colours other than hue variation.

Figure 6:
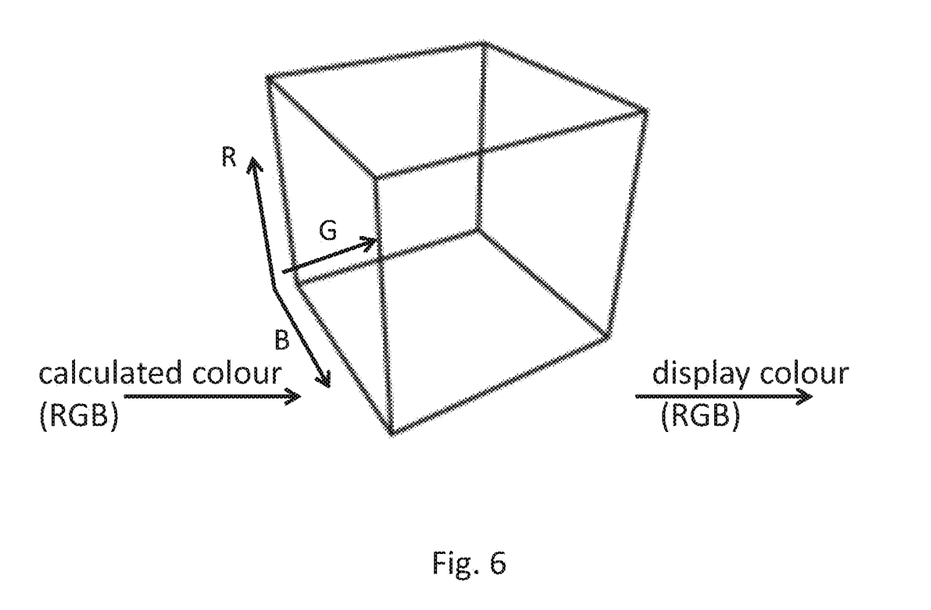

In the example of FIG. 6, a multi-dimensional mapping look up table is used, which is indexed by a cohort of input values (R, G, B) to provide a cohort of output values (R, G, B). This arrangement provides for a wider range of colour grading operations, given that any particular hue can be mapped by the LUT to any other hue.

Example Embodiment of Colour Grading Process

An example arrangement according to the present disclosure will be described with reference to FIGS. 7-9.

Figure 7:
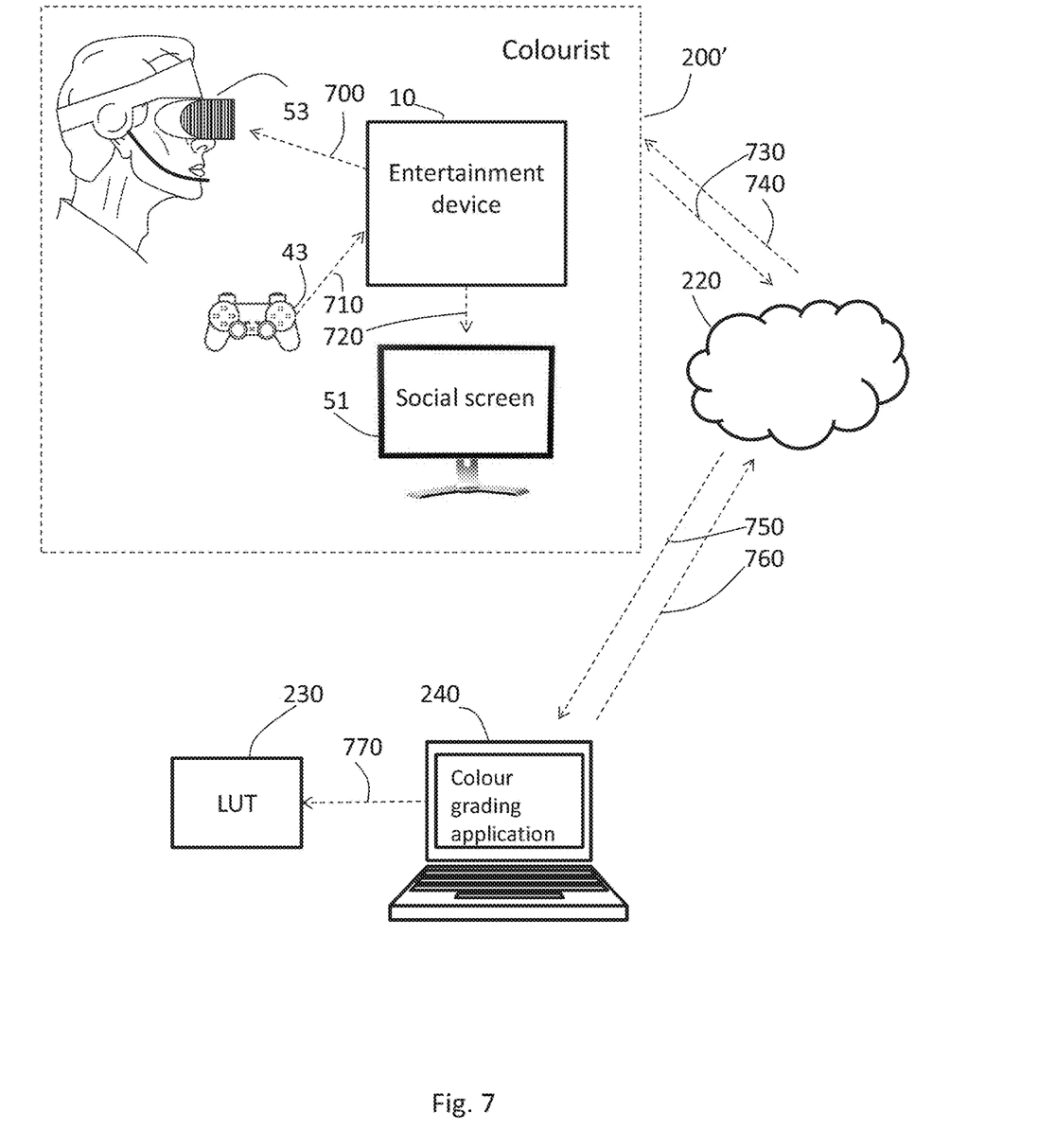
FIG. 7 schematically illustrates apparatus involved in a colour grading process.

The hardware arrangement of FIG. 7 is similar to that shown in FIG. 2, except that the display 51 is also shown, and broken lines, to be discussed below, indicate data or information transfer operations.

As part of the operations to be discussed below, the HMD 53 displays, as a user view 800, not only the video output of the video game under development but also, for example superposed over that video display, a set of colour grading controls for use by the colourist. These are shown as adjustable rotary controls 810, 820, 830 and slider controls 840, 850. The example shown in FIG. 8 are purely schematic, but the control operations provided by the set of displayed colour grading controls can include, for example, alterations to shadows, midtones, highlights, hue shift, contrast and exposure. The colourist may operate these controls using, for example, the game controller 43. Here, there are various options. Certain control buttons or other user operable devices of the game controller 43 could be reserved for alteration of the colour grading controls, such that they do not perform any function within the video game under test (or at least that game related function is suppressed for the purposes of the present colour grading operations). In other examples, separate respective controllers 43 could be provided for game operation of the video game under test and for operation by the colourist of the colour grading controls. In other examples, gaze-tracking or another biometric form of operation could be used to operate one or both of the game controls and the colour grading controls.

Figure 8:
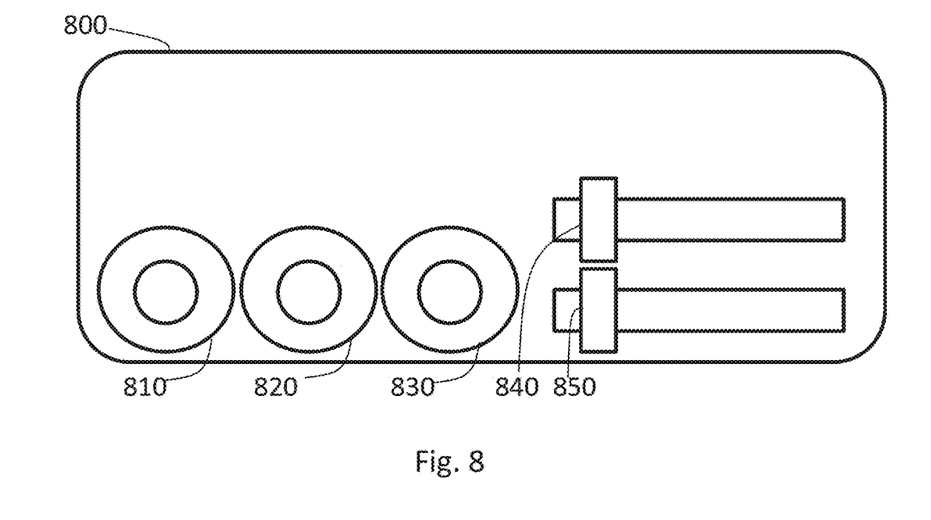
FIG. 8 schematically illustrates a user display.

Although the colour grading controls in the schematic diagram of FIG. 8 are shown to be relatively large within the display view 800 offered to the colourist, they could in practice be somewhat smaller, and/or the colourist could be provided with a control button or the like on the game controller 43 to enable or disable the display of the colour grading controls within the field of view, so that the colourist can selectively experience the full display view offered to the eventual game player.

A main aim of the present processes is to allow for the real-time display and adjustment of images to be displayed by the HMD 53, but the display by the display screen 51 is to provide a separate check that spectator-mode or so-called "social screen" display by a conventional display screen 51 also has appropriate colour grading and appears consistent with the view provided by the HMD 53. Either a separate colourist could inspect the output on the display screen 51, or the colourist could remove the HMD 53 temporarily to inspect that output and then returned to the HMD to make any alterations to the colour grading.

For operation in an HDR mode, both the display screen 51 and the HMD should be HDR-enabled.

Figure 9:
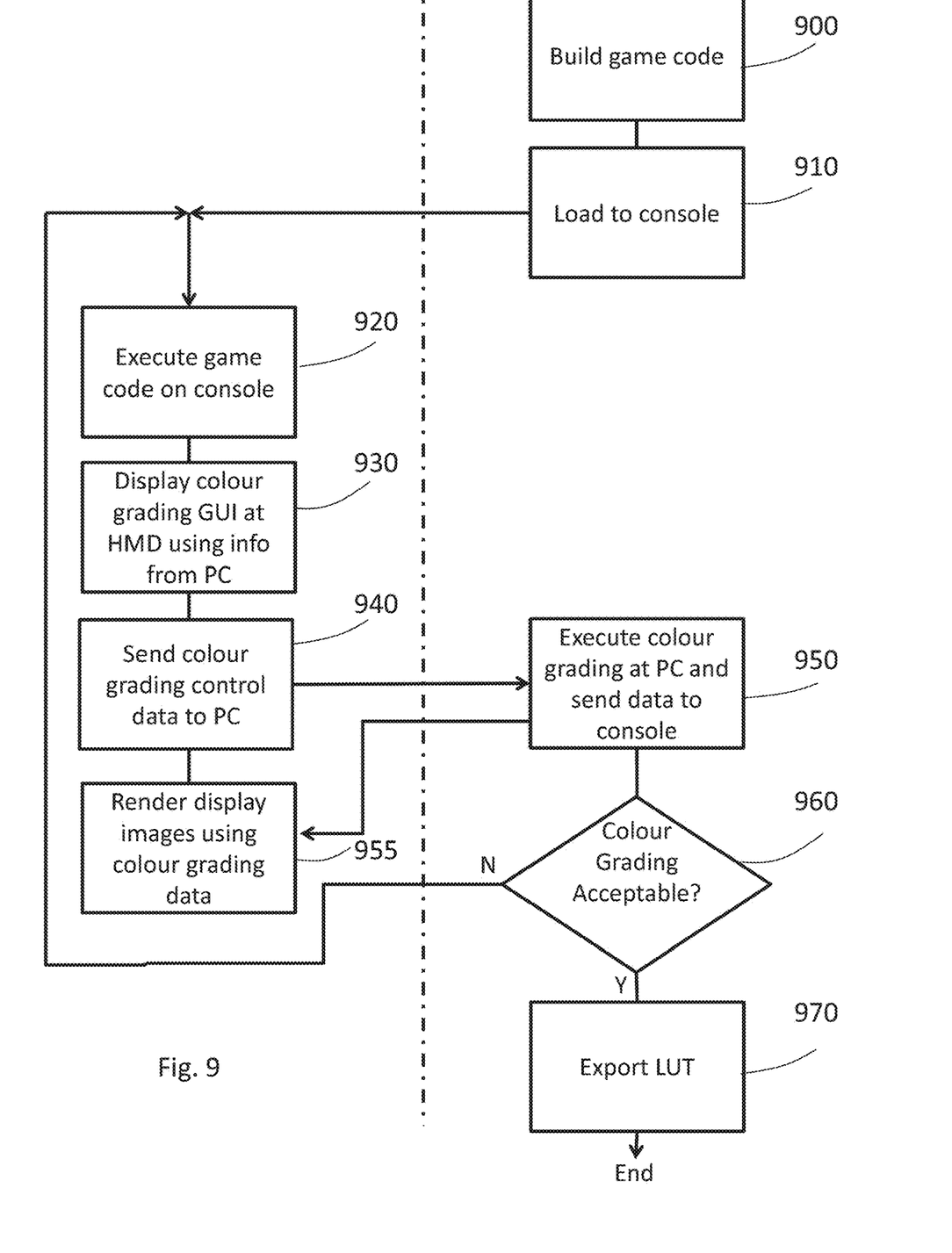
FIG. 9 is a schematic flowchart illustrating a method.

Referring to the flowchart of FIG. 9, a vertical broken line provides a schematic partition between example operations to be carried out by the console system 200 (to the left of the vertical broken line) and those carried out by the PC 240 (to the right of the vertical broken line)

Starting with the PC 240, a trial version of the game code is built at a step 900 and loaded to the console system 200 at a step 910.

At the console system 200, the game code is executed at a step 920. The console system generates (for example, renders) computer game images for display by the HMD 53, for example in real time and in response to in-game occurrences and/or operation of game controls. A colour grading control interface (referred to in FIG. 9 as a graphical user interface or GUI) is displayed at the HMD 53 to allow colour grading controls to be adjusted by the colourist wearing the HMD 53.

At a step 940 the console system sends to the PC 240 data representing the colour grading controls according to the GUI settings performed by the colourist. The PC 240 executes a colour grading application at a step 950 and returns output data to the console system 200.

Different options are available at this stage in the operation.

In a first example, the console system sends data representing the control operations by the colourist to the PC 240, which generates from them data (such as a provisional LUT) defining colour grading operations which are then performed by the console system 200 at a step 955 in order to render images for display, such that the display images presented to the user via the HMD 53 are adjusted using the prevailing settings.

In a second example, the console system sends data defining the prevailing colour grading to the PC 240 and also a video feed to the PC 240, either of the images as generated but before colour grading, or of the colour-graded images as presented to the user.

In the case that the console 200 sends a pre-adjustment video feed to the PC 240, the PC can perform the colour grading operations and return an adjusted video feed to the console 200 to be provided to the HMD 53 for display to the colourist. The PC may optionally display the adjusted video feed on a separate display so as to provide the opportunity for a further quality check, for example by another operator.

In the case that the console sends post-adjustment video data to the PC 240, the PC may display the received video feed to provide the opportunity for a further quality check, for example by another operator.

Therefore it will be appreciated that either the console system 200 or the PC 240 may be considered as apply the colour grading adjustments to the video images rendered by the rendering step. Indeed in some examples the two devices could be considered as acting in cooperation to do this.

If, at a step 960, the colour grading results are acceptable then control passes to a step 970 at which the results are exported by the PC 240 as a final version of a LUT 230 to be included within or associated with the final game code as built. if not, then the process continues at the step 920.

The various aspects of data communication discussed above are illustrated by the broken lines 700 . . . 770 in FIG. 7. These represent:

| | |
|---|---|
| 700 | display images to be presented to the user by the HMD 53 |
| 710 | control inputs from the controller 43 |
| 720 | social screen feed to monitor 51 |
| 730, 750 | at least grading data dependent upon user operation of GUI controls 810 . . . 850 |
| 740, 760 | communications received back from colour grading application running on PC 240 |
| 770 | LUT data at the step 970 |

The arrangements discussed above provide the potential advantage that the HDR colour grading required for a virtual reality (VR) video game title in HDR can be created by a colourist or artist using an HMD running the game, so the real time effects will be seen.

Figure 2:
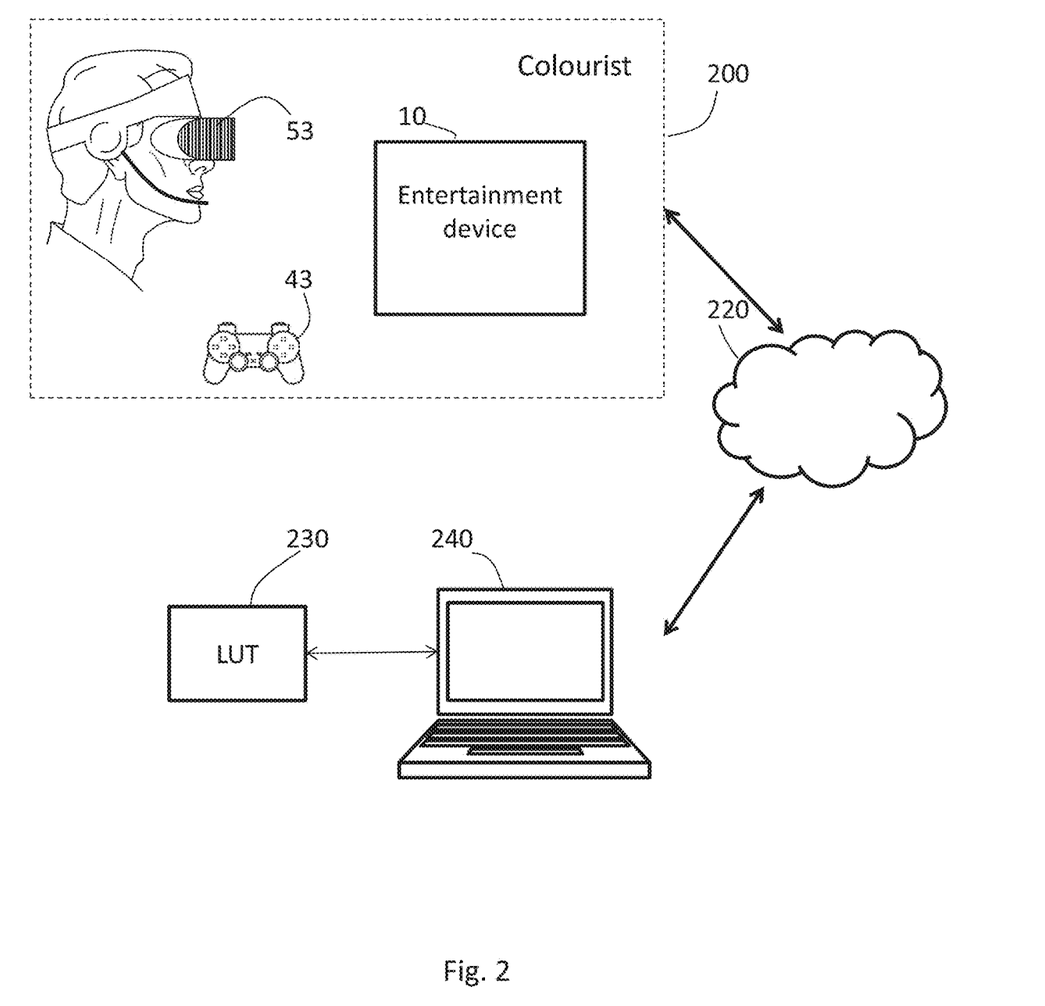
FIG. 2 schematically illustrates apparatus involved in a previously proposed colour grading process.

This can in turn provide time saving and improved initial accuracy of the colour grading operations over the arrangement of FIGS. 2 and 3 involving grading using a monitor on a PC. The output on a PC monitor and/or TV will be different to that on the HMD, which means that the user was previously required to view their colour grading operations or edits on a monitor and/or TV then review again using the HMD to verify the output is the desired one. By being able to view the edits in real-time directly on the HMD the initial accuracy of the edits can potentially remove many steps in the iteration of monitor/TV to HMD.

Colour grading using an HMD with HDR capabilities has different factors affecting the output from grading using a monitor on PC, the viewing environment will be completely dark, and the screen is much closer to the eyes, so user comfort must also be taken into account carefully when tuning the final look of a scene with a wide colour gamut and the high dynamic range. A colour grade may look acceptable in a bright viewing environment on a PC monitor but viewing on an HMD may be too bright and cause the user discomfort. Grading with an HMD will prevent this bad iteration as the colourist will grade for comfort as well as aesthetics.

The arrangement of FIG. 7 provides an example of data processing apparatus comprising:

a processing system comprising a first processing apparatus 200 and a second processing apparatus 240 in communication with the first processing apparatus, the first processing apparatus being configured to execute an initial version of computer game software, the executing including rendering computer game video images for display; and a head mountable display (HMD) 53 configured to display the video images;

the first processing apparatus being configured to detect user operation of one or more user controls 43, 810 . . . 850 to perform colour grading adjustments;

the processing system 200 and/or 240 being configured to apply the colour grading adjustments to the video images rendered by the rendering step; and the second processing apparatus 240 being configured to generate colour grading data to be associated with a revised version of the computer game software.

Multi Device Set-Up

In embodiments of the present description, the system may be a multi-device, and optionally multi-person set up, in which the colour grading is done whilst displaying on multiple different display devices.

In this case, the video feed is displayed not only on the HMD but also on an external display connected to a PC making the adjustment, and can optionally also be connected to another display connected for example to a console devkit. Each of the processing devices may have different rendering capabilities/configurations leading to very different display outputs. Notably, the colour grading and adjustments can be done whilst looking at all of these outputs simultaneously. Hence multiple people can view the various displays and can even control the grading to share the job: for example, one person on one device controls exposure, another person on another device controls hue/saturation levels, and the like. Hence as a non-limiting example, a colourist on the PC can use a mouse for control whilst a colourist on the devkit console can use a handheld controller, for example, to provide 2-way (or more) control.

It will be appreciated that where HDR video is used on one or more devices, the HDR exposure/colour ranges on different devices may vary considerably. In this case grading may be performed with reference to (or for the benefit of) one device, but visible on multiple devices, or may be performed to achieve a balance across multiple display devices.

Example Data Processing Apparatus

Figure 10:
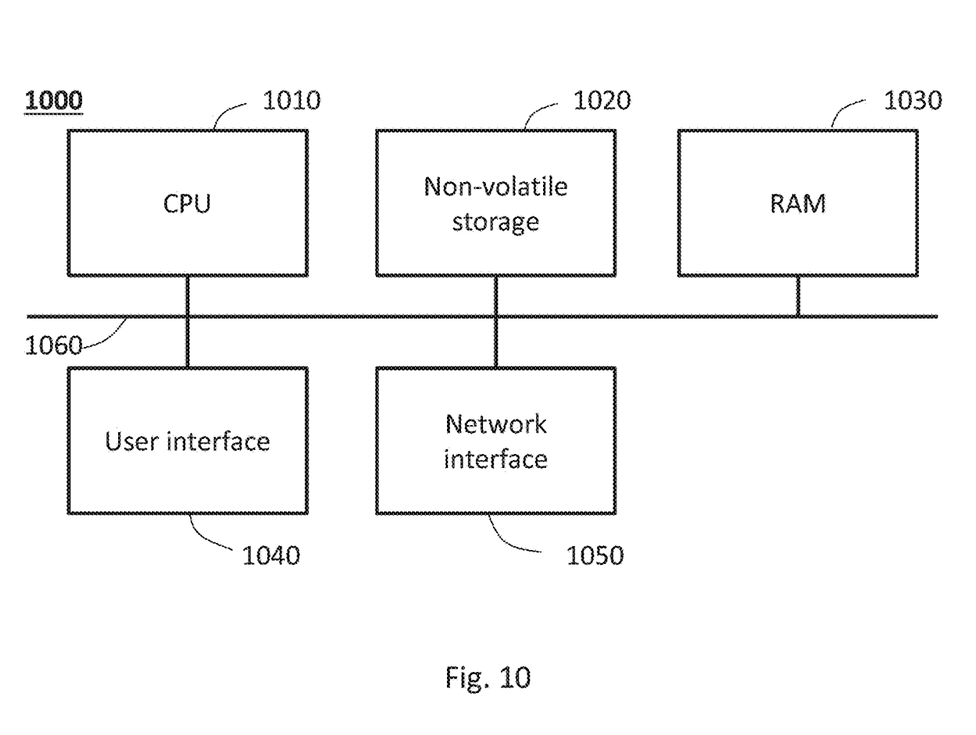
FIG. 10 schematically illustrates a data processing apparatus.

FIG. 10 provides a schematic example of a data processing apparatus 1000 suitable for performing the operations of the PC 240 discussed here. The example apparatus comprises a central processing unit (CPU) 1010, non-volatile storage 1020 (for example, a magnetic or optical disk device, a so-called solid state disk (SSD) device, flash memory or the like, providing an example of a machine-readable non-volatile storage device to store computer software by which the apparatus 1000 performs one or more of the present methods), a random access memory (RAM) 1030, a user interface 1040 such as one or more of a keyboard, mouse and a display, and a network interface 1050, all interconnected by a bus structure 1060. In operation, computer software to control the operation of the apparatus 1000 is stored by the non-volatile storage 1020 and is executed by the CPU 1010 to implement the methods discussed here, possibly with a temporary copy of the computer software and/or working data being held by the RAM 1030.

Summary Method

Figure 11:
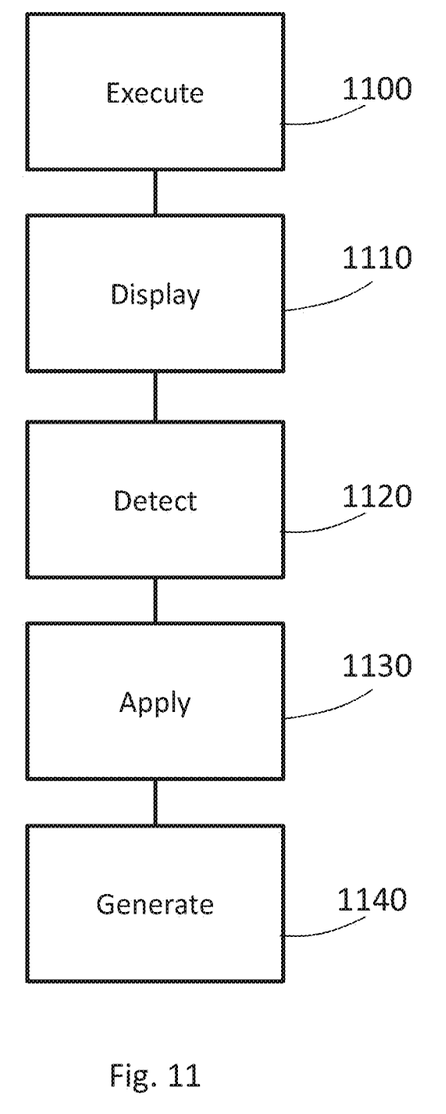
FIG. 11 is a schematic flowchart illustrating a method.

FIG. 11 is a schematic flowchart illustrating a summary computer-implemented method comprising:

executing (at a step 1100) an initial version of computer game software, the executing step including rendering computer game video images for display;

displaying (at a step 1110) the video images using a head mountable display (HMD) (the steps 1100 and 1110 corresponding generally to the step 920 discussed above);

detecting (at a step 1120) user operation of one or more user controls to perform colour grading adjustments (the step 1120 corresponding generally to the steps 930 and 940 discussed above); for example the user-operable control indicators may be displayed using the HMD, for example by superposing the user-operable control indicators on the video images for display by the HMD;

applying (at a step 1130) the colour grading adjustments to the video images rendered by the rendering step (the step 1130 corresponding generally to the step 950 discussed above); and generating (at a step 1140) colour grading data such as a colour look-up table to be associated with a revised version of the computer software (the step 1140 corresponding generally to the step 970 discussed above); in which the executing step and the applying step are performed by different respective data processing apparatus.

The method of FIG. 11 may be implemented by, for example, the set of nodes of FIG. 7, for example operating under software control (which could be respective software running at each node). The executing step and the applying step may be performed by different data processing apparatus. For example, a first processing apparatus (such as the console system 200 as an example of a computer games apparatus) and a second processing apparatus (such as the PC 240) in communication with the first processing apparatus may be used, for example in which: the first processing apparatus is configured to execute the initial version of computer software and to detect user operation of the one or more user controls; and the second processing apparatus is configured to apply the colour grading adjustments and to generate the colour grading data.

In so far as embodiments of the disclosure have been described as being implemented, at least in part, by software-controlled data processing apparatus, it will be appreciated that a non-transitory machine-readable medium (or multiple instances of such media) carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof.

Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method comprising:
   (a) executing a first trial version of computer game software on a first data processing apparatus to render a first set of computer game video images in a memory of the first data processing apparatus;
   (b) displaying the first set of computer game video images to a colourist using a head mountable display (HMD) coupled to the first data processing apparatus;
   (c) detecting user operation of one or more user controls from the colourist to create colour grading adjustments;
   (d) applying the colour grading adjustments to produce a second trial version of the computer game software on a second data processing apparatus, separate from the first data processing apparatus;
   (e) executing the second trial version of the computer game software on the first data processing apparatus to render a second set of computer game video images in the memory of the first data processing apparatus;
   (f) displaying the second set of computer game video images to the colourist using the head mountable display (HMD) coupled to the first data processing apparatus;
   (g) permitting the colourist to determine whether the second set of computer game video images exhibit satisfactory colour characteristics, and if not repeating (a)-(g) to apply one or more further colour grading adjustments, via the second data processing apparatus, and rendering, via the first data processing apparatus, one for more further sets of computer game video images; and
   (h) when the colourist determines that a current set of computer game video images exhibit satisfactory colour characteristics, generating colour grading data to be associated with a revised version of the computer game software.

2. The method of claim 1, comprising displaying user-operable control indicators to the colourist using the HMD to facilitate the user operation of the one or more user controls to create the colour grading adjustments.

3. The method of claim 2, in which the displaying step comprises superposing the user-operable control indicators on the first set of computer game video images for display by the HMD.

4. The method of claim 1, in which the colour grading data generated by the generating step comprises at least a colour look-up table.

5. The method of claim 1, wherein the first data processing apparatus is a computer games apparatus.

6. The method of claim 1, comprising the steps of:
   saving the colour grading data generated by the generating step; and
   generating the revised version of the computer game software including the saved colour grading data.

7. A non-transitory, computer readable storage medium containing computer software which, when executed by at least two respective computers, causes the computers to perform a method, comprising:
   (a) executing a first trial version of computer game software on a first data processing apparatus to render a first set of computer game video images in a memory of the first data processing apparatus;
   (b) displaying the first set of computer game video images to a colourist using a head mountable display (HMD) coupled to the first data processing apparatus;
   (c) detecting user operation of one or more user controls from the colourist to create colour grading adjustments;
   (d) applying the colour grading adjustments to produce a second trial version of the computer game software on a second data processing apparatus, separate from the first data processing apparatus;
   (e) executing the second trial version of the computer game software on the first data processing apparatus to render a second set of computer game video images in the memory of the first data processing apparatus;
   (f) displaying the second set of computer game video images to the colourist using the head mountable display (HMD) coupled to the first data processing apparatus;
   (g) permitting the colourist to determine whether the second set of computer game video images exhibit satisfactory colour characteristics, and if not repeating (a)-(g) to apply one or more further colour grading adjustments, via the second data processing apparatus, and rendering, via the first data processing apparatus, one for more further sets of computer game video images; and
   (h) when the colourist determines that a current set of computer game video images exhibit satisfactory colour characteristics, generating colour grading data to be associated with a revised version of the computer game software.

8. A data processing system, comprising:
   a first processing apparatus;
   a second processing apparatus, separate from, and in communication with, the first processing apparatus; and
   a head mountable display (HMD) in communication with the first processing apparatus, wherein the data processing system is adapted to carry out actions, comprising:
   (a) executing a first trial version of computer game software on the first data processing apparatus to render a first set of computer game video images in a memory of the first data processing apparatus;
   (b) displaying the first set of computer game video images to a colourist using the head mountable display (HMD) coupled to the first data processing apparatus;
   (c) detecting user operation of one or more user controls from the colourist to create colour grading adjustments;
   (d) applying the colour grading adjustments to produce a second trial version of the computer game software on the second data processing apparatus, separate from the first data processing apparatus;
   (e) executing the second trial version of the computer game software on the first data processing apparatus to render a second set of computer game video images in the memory of the first data processing apparatus;
   (f) displaying the second set of computer game video images to the colourist using the head mountable display (HMD) coupled to the first data processing apparatus;
   (g) permitting the colourist to determine whether the second set of computer game video images exhibit satisfactory colour characteristics, and if not repeating (a)-(g) to apply one or more further colour grading adjustments, via the second data processing apparatus, and rendering, via the first data processing apparatus, one for more further sets of computer game video images; and
(h) when the colourist determines that a current set of computer game video images exhibit satisfactory colour characteristics, generating colour grading data to be associated with a revised version of the computer game software.

9. The apparatus of claim 8, wherein the second processing apparatus is configured to save the colour grading data generated by the generating step and to generate the revised version of the computer game software including the saved colour grading data.

10. The apparatus of claim 8, wherein the first processing apparatus is a computer games machine.

* * * * *